US011439271B2

(12) United States Patent
Epping

(10) Patent No.: US 11,439,271 B2
(45) Date of Patent: Sep. 13, 2022

(54) COFFEE MACHINE FOR PREPARATION OF A HOT BEVERAGE

(71) Applicant: CUP & CINO KAFFEESYSTEM-VERTRIEB GMBH & CO. KG, Hövelhof (DE)

(72) Inventor: Frank Josef Paul Epping, Hövelhof (DE)

(73) Assignee: CUP & CINO KAFFEESYSTEM-VERTRIEB GMBH & CO. KG, Hovelhof (DE)

(*) Notice: Subject to any disclaimer, the term of this patent is extended or adjusted under 35 U.S.C. 154(b) by 565 days.

(21) Appl. No.: 16/510,435

(22) Filed: Jul. 12, 2019

(65) Prior Publication Data
US 2020/0054165 A1 Feb. 20, 2020

(30) Foreign Application Priority Data
Aug. 16, 2018 (DE) .................... 18189304.1

(51) Int. Cl.
A47J 31/30 (2006.01)
A47J 31/54 (2006.01)
A47J 31/057 (2006.01)
A47J 31/06 (2006.01)
(Continued)

(52) U.S. Cl.
CPC ........... A47J 31/542 (2013.01); A47J 31/057 (2013.01); A47J 31/0573 (2013.01); A47J 31/0576 (2013.01); A47J 31/0615 (2013.01); A47J 31/34 (2013.01); F24H 1/10 (2013.01); A47J 31/30 (2013.01)

(58) Field of Classification Search
CPC .. A47J 31/057; A47J 31/0573; A47J 31/0576; A47J 31/24; A47J 31/30; A47J 31/34
USPC ...................... 99/302 R, 302 P, 307
See application file for complete search history.

(56) References Cited

U.S. PATENT DOCUMENTS 6,701,068 B2    3/2004  Lin
10,149,570 B2*  12/2018  Sampaoli ............ A47J 31/465
(Continued)

FOREIGN PATENT DOCUMENTS

WO    WO-2014032110 A1 *  3/2014  ........... A47J 31/002
WO    2017068522 A1    4/2017

Primary Examiner — Reginald Alexander
(74) Attorney, Agent, or Firm — WRB-IP LLP

(57) ABSTRACT

Coffee machine (1) for preparation of a hot beverage with a heating system for dynamic thermal management, comprising a housing frame (2), in which are accommodated a water module (100) for providing brewing water, which comprises a first heating device (120), having a boiler (121) with a fresh water inlet (12) and with a first heating element (123) for providing water heated to a first temperature $T_1$ and a brewing module (200), whereby the brewing module (200) comprises a brewing device (220) for brewing a predefined amount of coffee with brewing water and a dispensing unit (230) for dispensing brewed coffee, as well as, disposed in a brewing water feed line (260), a second heating device (250), to heat the water heated to the first temperature $T_1$ to a second temperature $T_2$. The coffee machine provides for the second heating device (250) accommodated in the brewing module (200) being a thick film heater (252) designed as continuous flow heater.

13 Claims, 3 Drawing Sheets

(51) Int. Cl.
*F24H 1/10* (2022.01)
*A47J 31/34* (2006.01)

(56) References Cited

U.S. PATENT DOCUMENTS

| | | | | |
|---|---|---|---|---|
| 2007/0227363 | A1* | 10/2007 | Verna | A47J 31/54 |
| | | | | 99/279 |
| 2010/0098823 | A1* | 4/2010 | Nenov | A47J 31/36 |
| | | | | 426/433 |
| 2013/0108755 | A1* | 5/2013 | Carbonini | A47J 31/5253 |
| | | | | 426/433 |
| 2013/0129885 | A1* | 5/2013 | Doglioni Majer | A47J 31/368 |
| | | | | 426/431 |
| 2017/0217751 | A1* | 8/2017 | Jarisch | A47J 31/542 |
| 2018/0255962 | A1* | 9/2018 | Vetterli | A23F 5/262 |
| 2018/0317698 | A1* | 11/2018 | Epping | A47J 31/4485 |

* cited by examiner

COFFEE MACHINE FOR PREPARATION OF A HOT BEVERAGE

BACKGROUND AND SUMMARY

The present invention relates to a coffee machine for preparation of a hot beverage, in particular a coffee machine with a heating system for dynamic thermal management.

Known coffee machines for preparation of hot beverages have a heating system with hot water units for providing brewing water and/or steam. Hot brewing water is fed on the inlet side to a brewing device or respectively brewing unit provided in the coffee machine, and on the outlet side fully brewed coffee is dispensed. For this purpose, water is generally conveyed out of a water tank by means of a pump or similar device and is heated in one or more heating devices to a desired temperature. Known as heating element, besides simple flow heaters, which provide only a minimal flow volume of brewing water, are also boilers, in which larger quantities of brewing water can be heated to a desired temperature. Brewing water is thereby completely heated in a more or less large brewing water tank, and then fed to the brewing unit or also a plurality of brewing units. This is especially relevant in the case of coffee machines for professional use in cafés and bars, which are equipped for an increased workload, and with which accordingly some hundred to a thousand portions of coffee are prepared, irregularly distributed over the day.

Known is the use of a plurality of boilers in professional coffee machines in order to achieve a stable temperature constancy and also to reduce energy consumption, which is caused by heating and keeping at temperature a large amount of water. The second boiler can thereby store a considerably smaller volume of water and be directly assigned to the brewing device in order to heat the brewing water to a second temperature, the brewing temperature.

A heating device designed as boiler generally comprises in a lower region a heating element designed as heating coil, whereby a temperature stratification forms in the boiler. Fed thereby to the boiler from a water source is cold water by means of a pump via an inlet disposed in the lower or central region of the boiler, and heated brewing water is dispensed or respectively extracted from an upper region via a brewing water outlet port.

Besides the production of hot brewing water, the provision of steam is also desirable for the preparation of hot beverages, in particular coffee specialties. Steam can be used e.g. for foaming milk. Known are combined systems in which the included boiler is also set up to produce steam, in addition to heated brewing water. Convenient coffee machines, however, provide for separate devices to provide, on the one hand, heated brewing water, and, on the other hand, steam.

In any case, the heated brewing water flows from the heating device to the brewing device along a path of a certain distance, so that, depending upon type, point in time and frequency of previous brewing procedures, the temperature of the brewing water for the actual brewing process and thereby also for the brewing quality to be achieved fluctuates. The brewing quality is greatly dependent upon the brewing temperature, so that an ideal brewing temperature differs, depending upon coffee specialty, e.g. espresso, milk coffee, cappuccino, but in particular should be constant. Accordingly a coffee machine distinguishes itself, on the one hand, through a great thermal stability in order to minimize temperature fluctuations of the brewing water, which are noticeable with a continuous dispensing of water. On the other hand, a minimal thermal inertia should be present so that a quick reaction and adaptation to the required temperature can take place, in particular after switching off and resuming operation of the coffee machine.

Known from WO 2017/068522 is a professional coffee machine with a dispensing device for coffee as well as steam and hot water for preparation of tea and other things. Provided is a boiler, in which fed cold water is heated and in which the heated water is in equilibrium with steam, which can be extracted for further use. At least one heat exchanger is in thermal contact with the heated water in the boiler, so that water is thereby heated to a first temperature, and downstream, by means of a further temperature-controlled heating element, is further heated to a selectable brewing temperature. Via a possibly provided second heat exchanger in thermal contact with the boiler, water with another temperature can be provided for preparation of tea.

Known furthermore from U.S. Pat. No. 6,701,068 is a multi-stage heating set up for a coffee machine, whereby a first and a second heating device are provided along the flow path of the brewing water to be heated. In particular, by means of the second heating device, a temperature loss downstream from the first heating device should be compensated.

It is desirable to provide a coffee machine for preparation of a hot beverage which ensures an individually adjustable temperature, as optimal as possible, of the brewing water for preparation of coffee specialties as well as also preparation of tea and the like. Both a constant temperature can thereby be set, or also a temperature profile, or respectively temperature course, can be generated, whereby the brewing water is heated in a defined way during the brewing process. In particular a coffee machine also for professional use should be provided which is able to heat hot brewing water in sufficient quantity for different special uses to an adjustable optimal temperature quickly and reliably.

The coffee machine according to an aspect of the invention for preparation of a hot beverage comprises a housing frame, in which a water module and a brewing module are accommodated. Furthermore a steam module for generation and dispensing of steam can be disposed in the housing frame. The individual modules are integrated in the housing frame of the coffee machine and are connectible to one another electrically as well as in a fluid-conducting manner. The individual modules can be controlled by means of control devices individually assigned to them and/or by means of a central control unit. The coffee machine comprises a heating system for a dynamic thermal management with controllable heating devices, which are accommodated in part in the brewing module and in part in the water module.

The water module for providing brewing water comprises a first heating device, comprising a boiler with a fresh water inlet and with a first heating element for providing water heated to a first temperature $T1$. The water module is, for its part, modularly designed, and is accommodated in a water module housing. Besides the first heating element, further devices are included, for example a line system, as well as pumps, valves, metering devices and sensors, for providing heated and metered brewing water, which in a first stage is heated to a first temperature $T1$. The first temperature $T1$ lies preferably in the range of between 70° C. and 85° C. The temperature $T1$ is in particular slightly lower than an optimal temperature for preparation of a particular coffee specialty with high quality.

According to an aspect of the invention, the first heating device is designed as boiler, whereby a water tank is provided with a filling volume adapted to needs, in which, via a pump, water, preferably cold water, is fed in via a water inlet preferably disposed in the lower region. The degree of filling of water, or respectively the water level, can be determined by means of sensors and is available to the control system as a parameter. Boilers in connection with hot beverage makers are already known and can therefore be used cost-efficiently as a standard part. For example, a heating element of the boiler can be designed as a one-stage or multi-stage heating coil, which is disposed in the interior of the water tank, and in particular is distinguished by a high degree of efficiency. The boiler is set up to heat a certain volume of water to the first temperature $T1$ and to store this water until further use. The temperature of the water heated in the boiler can be controlled by means of one or more temperature sensors and a control device, or respectively a central control unit, whereby the latter acts upon the heating element in a controlling way.

The brewing module has a brewing device for brewing a predefined amount of coffee with brewing water and a dispensing unit for dispensing brewed coffee, as well as a second heating device, disposed in a brewing water feed line, in order to heat the water heated to the first temperature $T1$ to a second temperature $T2$. The brewing module can have in a brewing module housing, besides the brewing device and the dispensing unit, devices to feed in a metered way brewing water under pressure with a predefined temperature into a brewing unit with a brewing chamber for receiving the predetermined coffee quantity. In so doing the so-called brewing pressure can vary during the brewing process, i.e. during the extraction. Generally the brewing pressure amounts to about 9 bar. In one embodiment, the brewing device comprises a support, in which a portafilter with a filter is able to be accommodated, in which a predefined amount of ground coffee is tillable, whereby the brewing device comprises a brewing piston which is accommodated in a movable way for repeated closing and opening of the brewing chamber. Via the brewing water feed line, heated brewing water is able to be fed into the brewing chamber, the second heating device being disposed in the brewing water feed line in order to heat the brewing water individually according to need to the second temperature $T2$. Preferably the second temperature $T2$ corresponds to the optimal temperature for the coffee specialty to be brewed and is preferably between 80° C. and 98° C. It can also be provided for that the temperature varies during the brewing process, for example a temperature profile is created in the brewing water by means of the second heating device, in order to begin a brewing process at a lower temperature, in a gentle way to protect the ground coffee substance, and then to raise the temperature along the temperature profile to the corresponding, optimal temperature.

Furthermore the brewing device can comprise a bypass feed line, via which a definable amount of heated water is able to be fed as bypass water, is led past the amount of ground coffee filled in the brewing chamber, and, downstream of the brewing chamber, is brought together with the brewed coffee coming out of this chamber. The temperature of the bypass water can likewise be individually adjusted by means of the second heating device. The bypass water is especially relevant for the preparation of a cafés Americano.

According to an aspect of the invention, the second heating device accommodated in the brewing module is a thick film heater designed as continuous flow heater. The second heating device is set up in such a way that, on the one hand, it transfers well thermal energy generated with a heating element to the brewing water already heated in the first heating device and flowing through the second heating device, and, on the other hand, it has a small mass, so that it is controllable in a quick and reliable way and is able to be activated again after a resting period, i.e. it has a steep control curve or respectively a short reaction time. In the second heating element, designed as continuous flow heater, the water to be heated is in thermal contact with the heating element along a provided flow pathway. The second heating device comprises an electrical resistance heater, designed as thick film heater. For this purpose, the heating element is mounted on a substrate, preferably a ceramic substrate, with a certain layer thickness, so that this element has a limited thermal capacity. A thick film heater of this kind distinguishes itself by a relatively minimal delay in control performance, so that a consistent heat transfer to the flowing water is achieved. Alternatively, the second heating device can be designed as PTC heating resistor. Another alternative is for the second heating device to be designed as boiler with a certain capacity.

Through the arrangement of the second heating device in the brewing module, short connection paths between this device and the brewing chamber of the brewing module can be achieved, so that temperature losses along the flow pathway of the brewing water are minimized.

The second temperature $T2$, to which the water taken from the first heating device is individually heated in the second heating device, complies with the optimal temperature depending upon the coffee specialty to be produced and is generally between 80° C. to 98° C., preferably between 85° C. and 95° C. It is thereby to be considered that, on the one hand, at too high a brewing water temperature bitter substances are increasingly released from the coffee to be extracted, and, on the other hand, at too low a brewing water temperature flavoring substances are not sufficiently extracted, so that the taste is unsatisfactory.

Provided for in one embodiment is that accommodated in the water module is additionally a third heating device downstream of the first heating device, so that the water heated to the first temperature $T1$ for use as bypass water and/or for preparation of tea is led to a further, the third, heating device, which is assigned to the water module.

Thus the water stored in the boiler and heated in a first stage can be further heated individually and not just be made available via the brewing water feed line to the brewing module as brewing water, but instead can also be led, via correspondingly provided hot water lines, out of the boiler and be fed to the bypass feed line and/or to another application for preparation of tea or other infused beverages. The third heating device is assigned to the water module and is accommodated in the water module housing bounding the water module. According to an aspect of the invention, the third heating device is a thick film heater designed as continuous flow heater with a defined flow pathway for the water to be heated. Further devices can be disposed in the incorporated line system, which devices are necessary for controlled conveying and metering of water. Preferably these devices are disposed downstream from the first heating device and upstream from the third heating device. The temperature $T3$, adjustable by means of the third heating device, of the water heated in this way preferably is between 70° C. and 98° C. The temperature-controlled water can be fed via a line system to the brewing module or a plurality of brewing modules of the coffee machine as bypass water, separate feed lines to the brewing module or brewing modules being provided. Accordingly the plurality of brewing modules can also be designed differently. Furthermore the water can be led to a dispensing unit for heated water for preparation of tea or other infused beverages, whereby it can be mixed with cold water in a suitable way. Thus, for example, for preparation of green tea, the optimal temperature of about 70° C. and the optimal temperature for black tea or herbal tea of about 95° C. can be provided.

In an embodiment of the coffee machine it is foreseen that the water module has an individual control device; by means of this individual control device <control of> the first heating device and the third heating device as well as devices for conveying and metering of water is possible. Furthermore also the brewing module can have an individual control device for control of the second heating device and of devices for conveying, metering and brewing. Moreover a central control unit can be foreseen for control of the first, second and/or third heating device and devices for conveying, metering and brewing.

Important for an optimal brewing process, besides the precisely adjusted temperature or respectively a temperature profile, is an exact metering of the quantity of brewing water, which is able to be adjusted to the respective heating element. For this purpose, various restrictors are able to be disposed in the line and heating system conducting the brewing water, which devices vary with respect to diameter or are correspondingly adjustable, depending upon the coffee specialty to be prepared. Thus, for preparation of espresso, a constriction diameter of about 0.4 mm to 0.6 mm, for coffee with cream and/or cafés Americano about 0.7 mm to 0.9 mm and for use as bypass water about 0.5 mm to 0.8 mm has been shown to be particularly suitable.

In one embodiment, the coffee machine according to an aspect of the invention can be designed in a way comparable to a portafilter machine, whereby provided in the brewing device is a support in which a portafilter with a filter is receivable into which a predefined amount of coffee is fillable. The brewing device comprises a brewing piston which is supported in a movable way for repeated closing and opening of the brewing chamber. It can thereby also be foreseen that an operating lever, which is movable at least partly by hand, is provided whereby with movement of the operating lever in one direction the brewing piston in the brewing chamber is pushed into a pressing position and/or a brewing position. Furthermore adjustment means with a fluid system are provided which comprise at least one first cylinder/piston configuration, whereby the operating lever is in operative connection with a piston of the first cylinder/piston configuration and with adjustment means such that with movement of the operating lever in one direction pressure is built up in the fluid system, whereby the brewing piston disposed in a second cylinder/piston configuration in the brewing chamber is pushed into the pressing position and/or the brewing position.

BRIEF DESCRIPTION OF THE DRAWINGS

An embodiment example of the invention will be described more closely in the following with reference to the drawings.

DETAILED DESCRIPTION

Figure 1:
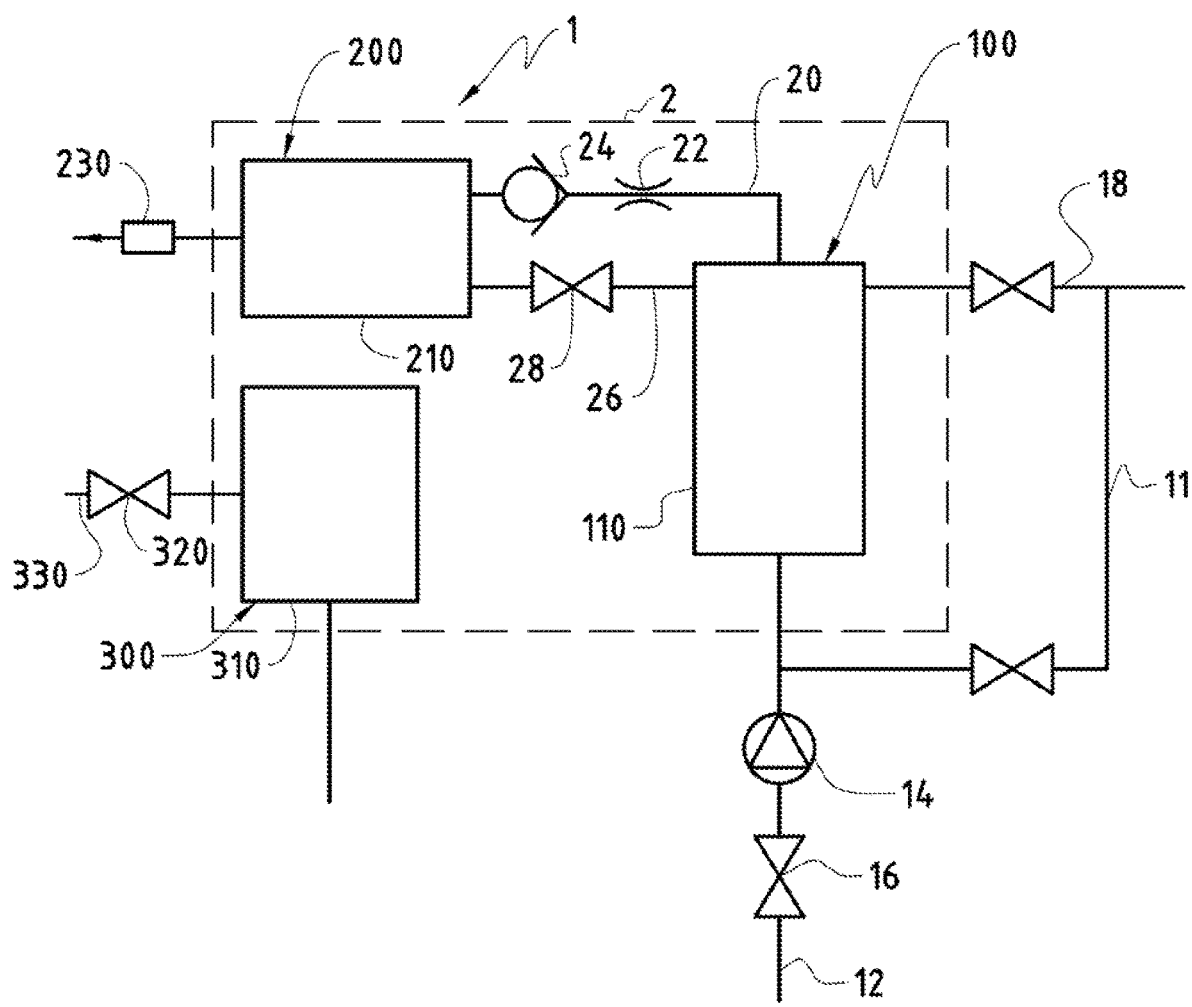
FIG. 1 shows schematically a coffee machine according to the invention for preparation of a hot beverage with a heating system for dynamic thermal management.

FIG. 1 shows schematically a coffee machine according to an aspect of the invention 1, comprising a water module 100, at least one brewing module 200 and, in the embodiment variant shown, a steam module 300, which are integrated into a housing frame 2. The modules are connected to one another electrically and in a fluid-conducting way, as is shown at least in part in FIG. 1. The water module 100 comprises a water module housing 110, the brewing module 200 a brewing module housing 210, and the steam module 300 a steam module housing 310, corresponding devices for conveying, metering and/or brewing and/or controlling being accommodated in the housings in each case (not shown).

Further details of the coffee machine 1 are not shown, in particular not those relating to devices for storing and/or grinding of coffee or respectively coffee powder, conveying equipment thereof, as well as a central control unit and actuation means and control means, which are moreover necessary for preparation of coffee. Likewise not shown is a rinsing system of the coffee machine 1, which is set up to rinse and/or evacuate fluid-conducting connections.

Shown in FIG. 1 is that preferably cold water is fed to the water module 100 via a fresh water feed line 12 from a water source, or respectively a water supply system, by means of a water pump 14 via a preferably controllable valve 16. The quantity of the fed water is able to be registered by means of a flow meter (not shown) and the captured value is able to be transmitted to a control unit (not shown) of the water module and/or a central control unit. Shown is a drain line 18, via which water heated in the water module is able to be fed in a metered way to a dispensing unit (not shown), possibly combined with a predefinable quantity of cold water fed via line 11, for preparation of tea or other infused beverages.

Furthermore connectible to the water module 100 is a line system for connection to the brewing module 200. The line system comprises a first line 20, in the course of which are disposed, for example, a restrictor 22 and a check valve 24, and by means thereof the brewing module 200 is able to be loaded with heated brewing water as bypass water, which is used for preparation of cafés Americano. The line system further comprises a second line 26 for fluid-conducting connection of the water module 100 to the brewing module 200, in which, in the embodiment example shown, a controllable valve 28 is disposed and via which the brewing module 200 is able to be loaded with heated brewing water. The at least one brewing module 200 is set up to brew a predetermined quantity of coffee and to dispense freshly brewed at at least one dispensing unit 230. For example, for preparation of a coffee specialty, a brewing chamber 240 disposed in the brewing module 200 is loaded with metered, heated and pressurized brewing water via the line 26.

The steam module 300 is assigned to the coffee machine 1 and is disposed in the housing frame 2 as a separate unit, which steam module is able to be loaded with water, preferably fresh water, and is set up to deliver steam to a steam outlet 330, controlled by a valve 320, for example for preparation of milk foam.

Figure 2:
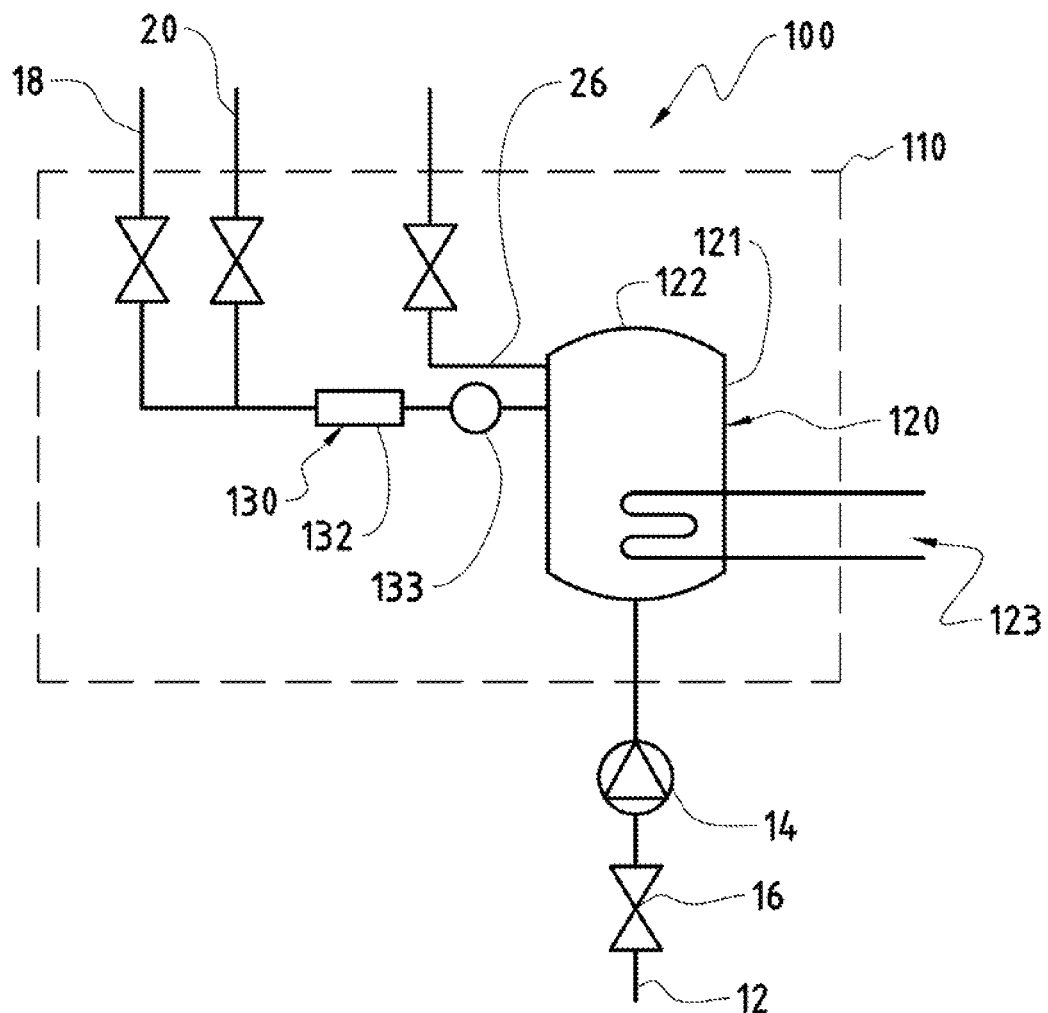
FIG. 2 shows schematically a water module of the coffee machine according to the invention.

Shown in FIG. 2 is the water module 100 of the coffee machine according to an aspect of the invention 1. The water module 100 is constructed modularly; preferably included devices and elements are disposed in the water module housing 110 and connected to one another electrically and in a fluid-conducting way.

Comprised is a first heating device 120, designed as boiler 121 in the embodiment example. The boiler 121 has a water tank 122, whose filling volume is adapted to the number of coffee portions to be prepared with the coffee machine 1. Disposed preferably in the lower region of the boiler 121 is the fresh water inlet 12, via which fresh water can be fed in a metered way by means of the water pump 14 and the valve 16. Furthermore shown schematically is a first heating element 123 of the first heating device 120, designed for example as a single or multi-stage heating coil, which warms the water filled in the water tank 122 to a first temperature T1. The temperature T1 can preferably be slightly lower than the temperature required for optimal brewing of the coffee beverage, which is, as a rule, between 85° C. and 95° C. Disposed on the boiler 120 can be a temperature sensor (not shown), which registers the heating of the water stored in the water tank 122 and transmits temperature values to the control device of the water module and/or a central control unit, which correspondingly controls the first heating device 120 and further devices of the water module. Provided furthermore in the water tank 122 are sensors (not shown) for registering the level of filling. It turns out to be advantageous that, with the heating of the brewing water in the first heating device 120, the limescale contained in the fresh water precipitates there and consequently not in the line system and in the devices downstream from the first heating device 120, which would lead to clogging of these elements.

The water heated in the first heating device 120 to the first temperature T1 is now available for further use. Accordingly, via the second line 26 disposed in the upper region of the boiler 121, water, heated to the temperature T1, can be fed to the brewing module 200 and be used there directly as brewing water. This will be explained more closely with reference to FIG. 3. In the case of a plurality of brewing modules 200, the line system is correspondingly configured for fluid-conducting connection of the water module 100 to the plurality of brewing modules 200.

The drain line 18 for fluid-conducting connection for delivery of water for preparation of tea and/or the first line 20 for fluid-conducting connection to the brewing module 200 are likewise disposed in the upper region of the boiler 121, whereby, according to an aspect of the invention, the heated water taken out of the boiler 121 is fed downstream of the boiler 121 to a third heating device 130. The third heating device 130 is designed as continuous flow heater, preferably as thick film heater 132. For this purpose, the third heating device 130 comprises an electric resistance heater designed as a ceramic thick film heater 132, whereby the heating element is mounted on a ceramic substrate and, in thermal contact therewith, a flow pathway for the water to be heated is available. The third heating device 130 heats the water to a temperature T3, which is adjusted to the optimal temperature for the further use, i.e. as bypass water or for preparation of tea or other infused beverages. Able to be disposed in the fluid-conducting connection between first heating device 120 and third heating device 130 is a restrictor 133, which controls the flow volume of flowing water, whereby corresponding information can be transmitted to a control device and/or a central control unit. Hence a control can be provided in order to activate or respectively deactivate the third heating device 130 as a function of the flow volume and temperature of the fed water.

An exact metering of the water quantity is necessary, in particular with the providing of bypass water. This metering should be adjusted to the extraction period for preparation of the coffee, so that both brewed coffee as well as also bypass water is dispensed together for a duration of time into a cup standing ready. This is achieved, for example, by means of a restrictor 133, which can be either adjustable or whose diameter is correspondingly selected. The diameter should not be so large that the discharge of the bypass water is not impact-like. However, with too small a diameter, the problem arises that bypass water is delivered over a longer time span and thereby possibly exceeds the extraction period of the coffee. The flow pathway of the bypass water takes place by means of the first line 20, in whose course a restrictor 22 and the check valve 24 are disposed, for example.

Figure 3:
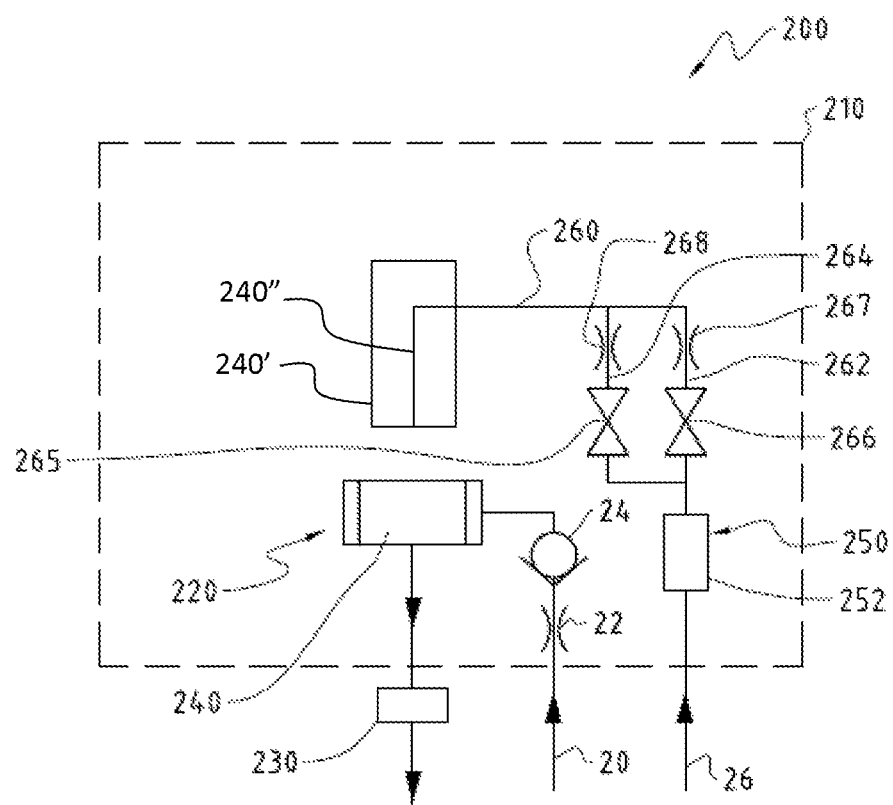
FIG. 3 shows schematically a brewing module of the coffee machine according to the invention.

The brewing module 200 of the coffee machine according to an aspect of the invention 1 is shown in FIG. 3. The brewing module 200 is also constructed modularly, whereby this module comprises, disposed in the brewing module housing 210, at least one brewing device 220 for brewing a predetermined amount of coffee with pressurized, metered brewing water and a dispensing unit 230 for dispensing freshly brewed coffee. In particular the brewing device 220 has in a brewing unit a brewing chamber 240, into which a predetermined amount of coffee is receivable and into which, via a brewing water feed line 260, the metered brewing water is able to be introduced.

Furthermore the brewing module 200 comprises devices to heat the brewing water, under pressure, to a predefined temperature. The brewing water, which is finally introduced into the brewing chamber 240, is heated by means of the first heating device 120 to the first temperature T1 and is fed to the brewing chamber 240 via fluid-conducting lines, or respectively via the second line 26 and the brewing water feed line 260, whereby it is further heated by means of a second heating device 250.

In the embodiment shown, it is foreseen that parallel flow pathways 262, 264 are provided upstream of the brewing chamber 240 and downstream of the second heating device 250. Disposed in the parallel flow pathways 262, 264 are one valve 265, 266 and one restrictor 267, 268 each. Provided selectively by means of the restrictors 267, 268 can be metered water for preparation of espresso and coffee with cream or respectively Americano, whereby for preparation of espresso a smaller amount of brewing water is called for than the amounts for preparation of coffee with cream/Americano. Accordingly the jet diameters of the restrictors 267, 268 can differ with respect to their diameter.

Assigned to the brewing module 200 and accommodated in the brewing module housing 210 is the second heating device 250, which, as continuous flow heater, is designed as thick film heater 252. The second heating device 250 is set up to heat the brewing water conducted along a flow pathway provided therein to an adjustable temperature T2. The heating element included in the second heating device 250 is designed as electrical resistance heater or respectively as thick film heater 252 and is controllable by a control device of the brewing module 200 and/or a central control unit according to input requirements. Provided for this purpose can be at least one temperature sensor (not shown) with reference to the second heating, device 250, which detects a temperature measurement value preferably on the outlet side and/or the inlet side and transmits these values to the control device of the brewing module and/or to the central control unit. Thus a control system can control the electrical current applied to the electrical resistance heater as a function of temperature measurement values. The configuration of the second heating device 250 in the brewing module 200 permits short flow pathways to the entrance of the heated brewing water into the brewing chamber 240 downstream from the second heating device 250, so that the heated brewing water, temperature-controlled to an optimal temperature, can be led into the brewing chamber 240 without significant temperature fluctuations. The brewing water heated in this way can be used inside the brewing device 220 to brew the coffee beverage by guiding or respectively pressing, via the cylinder 240' and piston 240"

configuration, the brewing water through the ground coffee or coffee powder received in the brewing chamber 240 and to dispense it at the dispensing unit 230 as a freshly brewed coffee specialty.

The invention claimed is:

1. Coffee machine for preparation of a hot beverage, comprising a housing frame, in which are accommodated:
a water module for providing brewing water, whereby the water module comprises a first heating device, which first heating device comprises a boiler with a water tank with a fresh water inlet and a first heating element configured for heating water to a first temperature T1, and
a brewing module, with a brewing device for brewing a predefined amount of coffee with brewing water and with a dispensing unit for dispensing brewed coffee, as well as, disposed in a brewing water feed line, a second heating device, configured to heat the water heated to the first temperature T1 by the first heating device, the second heating device being upstream of the brewing device to a second temperature T2, where T2 is greater than T1,
wherein the second heating device accommodated in the brewing module is a thick film heater designed as continuous flow heater.

2. Coffee machine according to claim 1, wherein accommodated in the water module is a third heating device downstream of the first heating device.

3. Coffee machine according to claim 1, wherein the first temperature T1 of the water adjustable by the first heating device is between 70° C. and 85° C.

4. Coffee machine according to claim 1, wherein the temperature T2 of the water adjustable by the second heating device is between 80° C. and 98° C.

5. Coffee machine according to claim 1, wherein the second heating device is set up to heat the water according to a predetermined temperature profile to the adjustable second temperature T2.

6. Coffee machine according to claim 2, wherein the temperature T3 of the water adjustable by the third heating device is between 70° C. and 98° C.

7. Coffee machine according to claim 2, wherein the water heated by the third heating device is fed as bypass water to the brewing device, and downstream of a brewing chamber of the brewing device is brought together with the coffee brewed in the brewing device and is dispensed at the dispensing unit.

8. Coffee machine according to claim 1, wherein the brewing device comprises a brewing piston which is supported in a movable way for repeated closing and opening of the brewing chamber.

9. Coffee machine according to claim 2, wherein the water module comprises an individual control device for control of the first heating device and of the third heating device, as well as devices for conveying and metering of water.

10. Coffee machine according to claim 1, wherein the brewing module has an individual control device for control of the second heating device and devices for conveying, metering of brewing water and brewing.

11. Coffee machine according to claim 2, wherein a central control unit is included for control of the first, second and third heating devices and devices for conveying, metering and brewing.

12. Coffee machine for preparation of a hot beverage, comprising a housing frame, in which are accommodated:
a water module for providing brewing water, whereby the water module comprises a first heating device, which first heating device comprises a boiler with a water tank with a fresh water inlet and a first heating element for heating water to a first temperature T1, and
a brewing module, with a brewing device for brewing a predefined amount of coffee with brewing water and with a dispensing unit for dispensing brewed coffee, as well as, disposed in a brewing water feed line, a second heating device, to heat the water heated to the first temperature T1 upstream of the brewing device to a second temperature T2,
wherein the second heating device accommodated in the brewing module is a thick film heater designed as continuous flow heater, wherein accommodated in the water module is a third heating device downstream of the first heating device, wherein the third heating device is a thick film heater designed as continuous flow heater.

13. Coffee machine for preparation of a hot beverage, comprising a housing frame, in which are accommodated:
a water module for providing brewing water, whereby the water module comprises a first heating device, which first heating device comprises a boiler with a water tank with a fresh water inlet and a first heating element for heating water to a first temperature T1, and
a brewing module, with a brewing device for brewing a predefined amount of coffee with brewing water and with a dispensing unit for dispensing brewed coffee, as well as, disposed in a brewing water feed line, a second heating device, to heat the water heated to the first temperature T1 upstream of the brewing device to a second temperature T2,
wherein the second heating device accommodated in the brewing module is a thick film heater designed as continuous flow heater, wherein accommodated in the water module is a third heating device downstream of the first heating device, wherein the water heated by the third heating device is fed to a dispensing unit by a drain line and is mixed with cold water, for preparation of tea or similar infused beverages.

* * * * *